US006424252B1

(12) United States Patent
Adler

(10) Patent No.: US 6,424,252 B1
(45) Date of Patent: Jul. 23, 2002

(54) PAGING SYSTEM FOR WASHERS AND DRYERS

(76) Inventor: Maury Adler, 2425 Hunter St., Los Angeles, CA (US) 90021

(*) Notice: Subject to any disclaimer, the term of this patent is extended or adjusted under 35 U.S.C. 154(b) by 0 days.

(21) Appl. No.: 09/735,044
(22) Filed: Dec. 13, 2000
(51) Int. Cl.[7] ................................................ H04Q 1/30
(52) U.S. Cl. .................... 340/311.2; 340/539; 340/657; 340/660; 340/664; 340/683; 340/825.44
(58) Field of Search ............................. 340/539, 311.2, 340/635, 657, 660, 664, 679, 683, 825.44

(56) References Cited

U.S. PATENT DOCUMENTS 4,797,656 A * 1/1989 Keppler ...................... 340/539
4,916,439 A * 4/1990 Estes et al. ................. 340/679
5,089,809 A * 2/1992 Carmichael, Jr. ........... 340/679
5,586,174 A * 12/1996 Bogner et al. .............. 340/679
6,157,313 A * 12/2000 Emmermann .......... 340/825.44

* cited by examiner

*Primary Examiner*—Daniel J. Wu
(74) *Attorney, Agent, or Firm*—Goldstein & Lavas, P.C.

(57) ABSTRACT

A paging system for washers and dryers including a transmitter adapted for coupling with a washer and dryer. The transmitter can detect an end of a cycle of the washer and dryer. The transmitter includes a plurality of function buttons. A receiver is provided that is adapted for being worn by the person. The receiver is in communication with the transmitter whereupon the transmitter detecting the end of the cycle, the receiver will be sent a signal. The receiver includes an alarm that is activated upon receiving the signal. The receiver includes a plurality of function buttons.

1 Claim, 2 Drawing Sheets

PAGING SYSTEM FOR WASHERS AND DRYERS

BACKGROUND OF THE INVENTION

The present invention relates to a paging system for washers and dryers and more particularly pertains to alerting a person that a cycle has been completed by one of these machines.

Typically, a person will load their clothes in a washer or a dryer and then start the machine for a predetermined length of time or cycle. Once the cycle has ended, the machine will automatically turn off. Some machines are equipped with alarms or buzzers that will sound once the cycle has ended. Most of the time, these machines are located in remote areas of peoples homes, such as basements or garages, thereby preventing the person from hearing the buzzer. Thus, people are usually unaware that the washing or drying cycle has been completed with the resulting clothes remaining in the machine needing to be folded or dried. What is needed is a way to notify these people that the cycle for their washer or dryer has been completed that is simple for people to carry on their person while these machines are operating.

The present invention attempts to solve the abovementioned problem by providing a device that is comprised of a transmitter coupled with the washer or dryer and a corresponding receiver that can be carried by the person in a manner similar to a pager.

The use of remote control devices is known in the prior art. More specifically, remote control devices heretofore devised and utilized for the purpose of controlling and monitoring machines from a distance are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,916,439 to Estes discloses a wireless remote device for indicating the status of a washing machine or dryer through the use of a current sensor, vibration sensor, or a sensor integral with the washing machines control. U.S. Pat. No. 5,757,643 to Kuroda discloses a remote management system for a number of washing machines and dryers. U.S. Pat. No. 5,089,809 to Carmichael, Jr. discloses means for monitoring the status of a number of appliances. U.S. Pat. No. 5,285,375 to Kim discloses a remote control unit for a washing machine.

While these devices fulfill their respective, particular objective and requirements, the aforementioned patents do not describe a paging system for washers and dryers for alerting a person that a cycle has been completed by one of these machines.

In this respect, the paging system for washers and dryers according to the present invention substantially departs from the conventional concepts and designs of the prior art, and in doing so provides an apparatus primarily developed for the purpose of alerting a person that a cycle has been completed by one of these machines.

Therefore, it can be appreciated that there exists a continuing need for a new and improved paging system for washers and dryers which can be used for alerting a person that a cycle has been completed by one of these machines. In this regard, the present invention substantially fulfills this need.

SUMMARY OF THE INVENTION

In the view of the foregoing disadvantages inherent in the known types of remote control devices now present in the prior art, the present invention provides an improved paging system for washers and dryers. As such, the general purpose of the present invention, which will be described subsequently in greater detail, is to provide a new and improved paging system for washers and dryers which has all the advantages of the prior art and none of the disadvantages.

To attain this, the present invention essentially comprises a transmitter adapted for coupling with a washer and dryer. The transmitter has means for detecting an end of a cycle of the washer and dryer. The transmitter includes a plurality of function buttons. A receiver is provided that is adapted for being worn by the person. The receiver is in communication with the transmitter whereupon the transmitter detecting the end of the cycle, the receiver will be sent a signal. The receiver includes an alerting means activated upon receiving the signal. The receiver includes a plurality of function buttons.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved paging system for washers and dryers which has all the advantages of the prior art remote control devices and none of the disadvantages.

It is another object of the present invention to provide a new and improved paging system for washers and dryers which may be easily and efficiently manufactured and marketed.

It is a further object of the present invention to provide a new and improved paging system for washers and dryers which is of durable and reliable construction.

An even further object of the present invention is to provide a new and improved paging system for washers and dryers which is susceptible of a low cost of manufacture with regard to both materials and labor, and which accordingly is then susceptible of low prices of sale to the consuming public, thereby making such a paging system for washers and dryers economically available to the buying public.

Even still another object of the present invention is to provide a new and improved paging system for washers and dryers for alerting a person that a cycle has been completed by one of these machines.

Lastly, it is an object of the present invention to provide a new and improved paging system for washers and dryers including a transmitter adapted for coupling with a washer and dryer. The transmitter has means for detecting an end of a cycle of the washer and dryer. The transmitter includes a plurality of function buttons. A receiver is provided that is adapted for being worn by the person. The receiver is in communication with the transmitter whereupon the transmitter detecting the end of the cycle, the receiver will be sent a signal. The receiver includes an alerting means activated upon receiving the signal. The receiver includes a plurality of function buttons.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
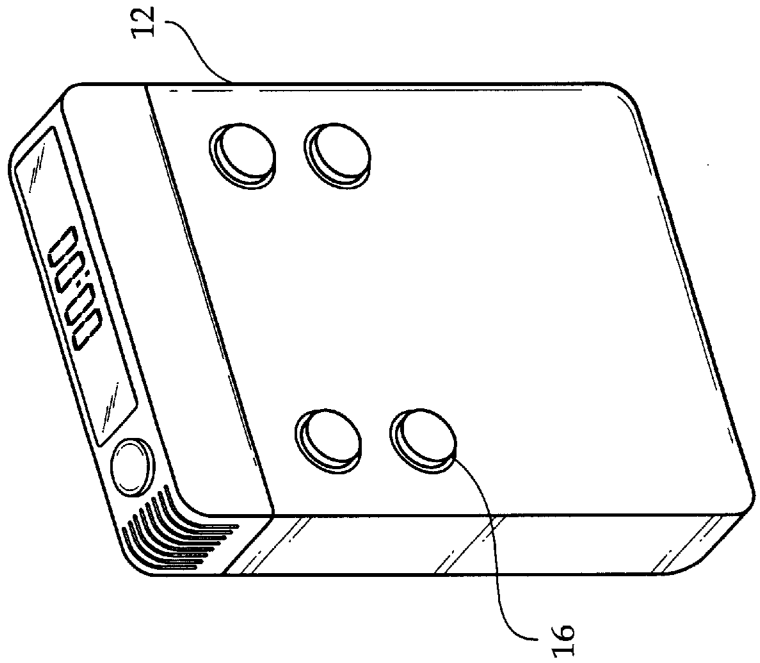
FIG. 2 is a perspective view of the transmitter of the present invention.
Figure 1:
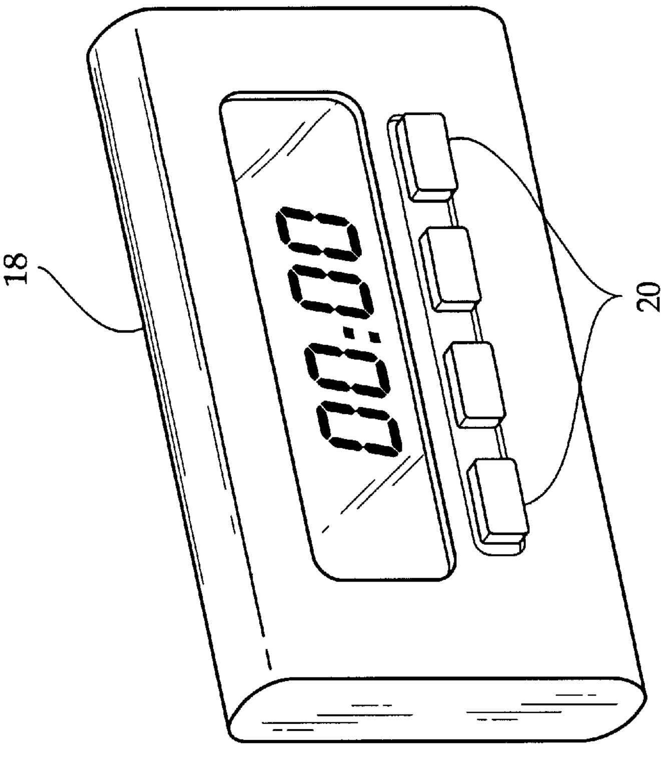
FIG. 1 is a perspective view of the receiver of the paging system for washers and dryers constructed in accordance with the principles of the present invention.
Figure 3:
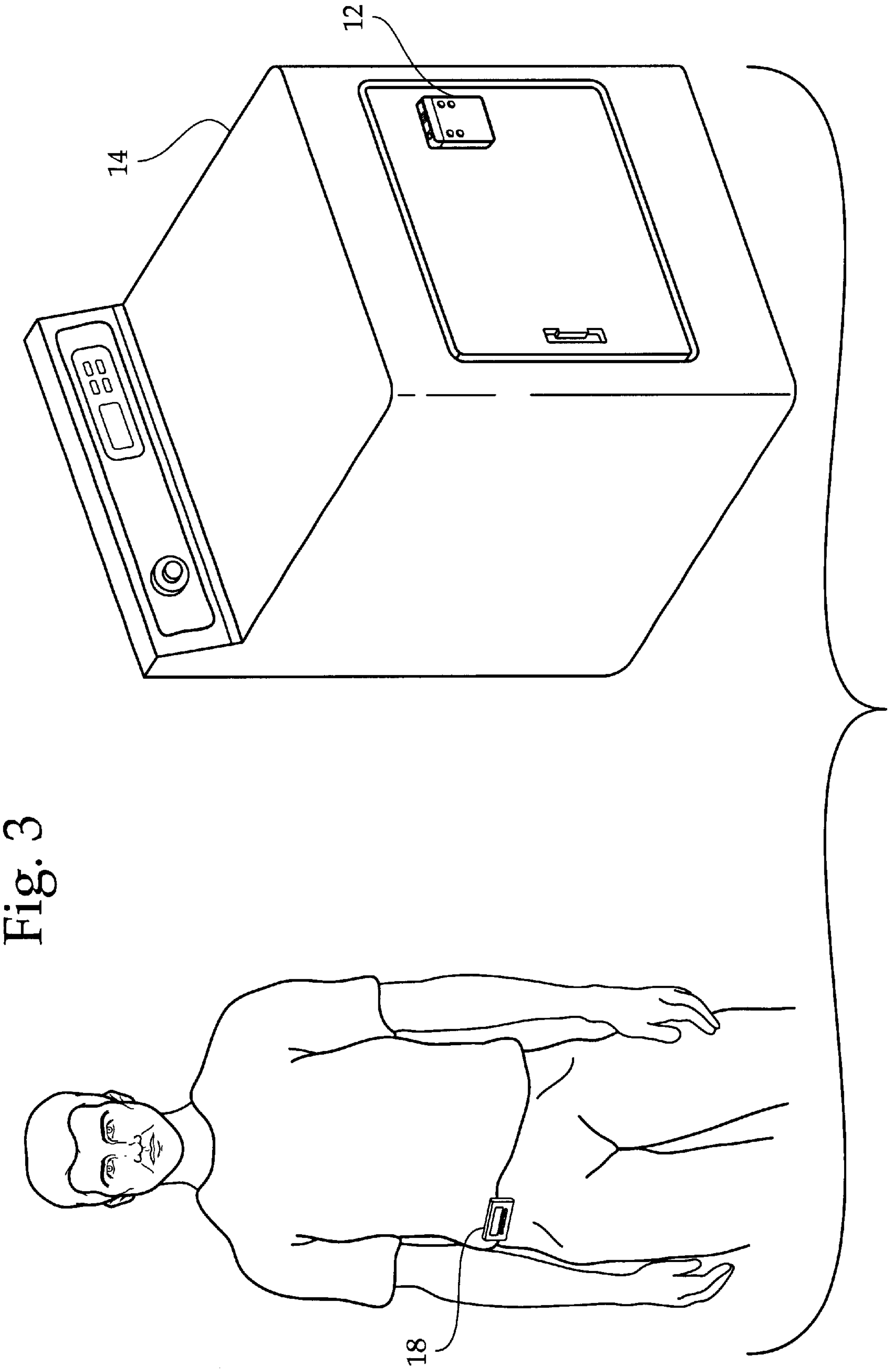
FIG. 3 is a perspective view of the present invention illustrated in use.

With reference now to the drawings, and in particular, to FIGS. 1 through 3 thereof, the preferred embodiment of the new and improved paging system for washers and dryers embodying the principles and concepts of the present invention and generally designated by the reference number 10 will be described.

Specifically, it will be noted in the various figures that the device relates to a paging system for washers and dryers for alerting a person that a cycle has been completed by one of these machines. In its broadest context, the device consists of a transmitter and a receiver. Such components are individually configured and correlated with respect to each other so as to attain the desired objective.

The transmitter 12 is adapted for coupling with a washer and dryer 14. Note FIGS. 2 and 3. The transmitter 12 has means for detecting an end of a cycle of the washer and dryer 14. The transmitter 12 includes a plurality of function buttons 16. The transmitter 12 can operate in a number of ways. First, the transmitter 12 can be attached to the lid of the washing machine or dryer by a magnet or the like and will be capable of sensing the vibrations of the machine. Once the machine has stopped vibrating, the transmitter 12 will be activated. Second, for a more accurate version of the prior example, the transmitter 12 is placed interiorly of the washer or dryer. Third, the transmitter 12 will be placed in contact with the machine and can be activated either by hearing a buzzer or alarm of the machine that typically indicates the end of the cycle or by sensing a light of the machine going on or off to indicate the end of the cycle. Fourth, the transmitter 12 can be in communication with the main power line of the machine. Once the transmitter 12 senses the lack of power going to the machine, usually due to the end of a cycle, it's signal will be sent. The function buttons 16 typically relate to setting timers and time of day.

The receiver 18 is adapted for being worn by the person. Note FIG. 3. The receiver 18 would be worn in a manner similar to a standard pager. The receiver 18 is in communication with the transmitter 12 whereupon the transmitter detecting the end of the cycle, the receiver 18 will be sent a signal. The receiver 18 includes an alerting means activated upon receiving the signal. The alerting means will typically either be an audible alarm or vibration. The receiver 18 includes a plurality of function buttons 20. These function buttons 20 will allow the user to deactivate the signal transmission from the transmitter 12 to the receiver 16 as well as a timer and rest buttons.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A paging system for washers and dryers for alerting a person that a cycle has been completed by one of these machines comprising, in combination:

a transmitter adapted for coupling with a washer and dryer, the transmitter having means for detecting an end of a cycle of the washer and dryer, said transmitter sensing vibrations, alarms, and lights of the machine that indicate a completed cycle, the transmitter including a plurality of function buttons; and a receiver adapted for being worn by the person, the receiver being in communication with the transmitter whereupon the transmitter detecting the end of the cycle, the receiver will be sent a signal, the receiver including alerting means activated upon receiving the signal, the receiver including a plurality of function buttons.

* * * * *